United States Patent [19]

Nakamura et al.

[11] 4,440,560
[45] Apr. 3, 1984

[54] MIXED PHOSPHATIC FERTILIZER AND PROCESS FOR PRODUCING THE SAME

[75] Inventors: Teruo Nakamura; Michio Kiyoto; Kazuo Akashi; Isao Hasegawa, all of Tokyo, Japan

[73] Assignee: Japan Metals and Chemicals Co., Ltd., Tokyo, Japan

[21] Appl. No.: 333,441

[22] Filed: Dec. 22, 1981

Related U.S. Application Data

[63] Continuation of Ser. No. 185,741, Sep. 10, 1980, abandoned.

[30] Foreign Application Priority Data

Dec. 13, 1979 [JP] Japan .................. 54-161841

[51] Int. Cl.$^3$ ............................. C05B 21/00
[52] U.S. Cl. .......................... 71/24; 71/11; 71/33; 71/41; 71/37; 71/48
[58] Field of Search ............... 71/24, 44, 48, 33, 11, 71/DIG. 2, 41, 37

[56] References Cited

U.S. PATENT DOCUMENTS 1,530,397  3/1925  Oden et al. ............................. 71/24
3,114,625  12/1963  Higuchi et al. ..................... 71/24 X
3,197,300  7/1965  Tomioka ............................. 71/11 X
4,006,004  2/1977  Seferian et al. ......................... 71/11

FOREIGN PATENT DOCUMENTS 38-07062   5/1963  Japan ...................................... 71/33
4513802   11/1964  Japan ...................................... 71/24
4519603    4/1966  Japan ...................................... 71/33
4634168    2/1967  Japan ...................................... 71/33
46-37354  11/1971  Japan ..................................... 71/903
588219    1/1978  U.S.S.R. ................................. 71/24

OTHER PUBLICATIONS

Chem. Abstracts 54:7026; 1960; Mayr et al.
Chem. Abstracts 54:7026d; 1959; Nabiev et al.

Primary Examiner—Kenneth M. Schor
Attorney, Agent, or Firm—Parkhurst & Oliff

[57] ABSTRACT

In producing a mixed phosphatic fertilizer, humic acid is mixed with fused phosphate to cause the humic acid to react on alkaline ingredients of the fused phosphate for turning these alkaline ingredients into chelate compounds, so that water-soluble phosphoric acid contents of succeedingly added phosphatic fertilizers such as calcium superphosphate and calcium triple-superphosphate are not reduced or insolubilized by being reacted with such alkaline ingredients. Thus, unlike the prior art, a stabilized predetermined level of water-soluble phosphoric acid contents can be secured in the resultant mixed phosphatic fertilizer along with a predetermined level of citric acid-soluble phosphoric acid contents.

1 Claim, 1 Drawing Figure

TIME (MONTH AFTER PRODUCTION)

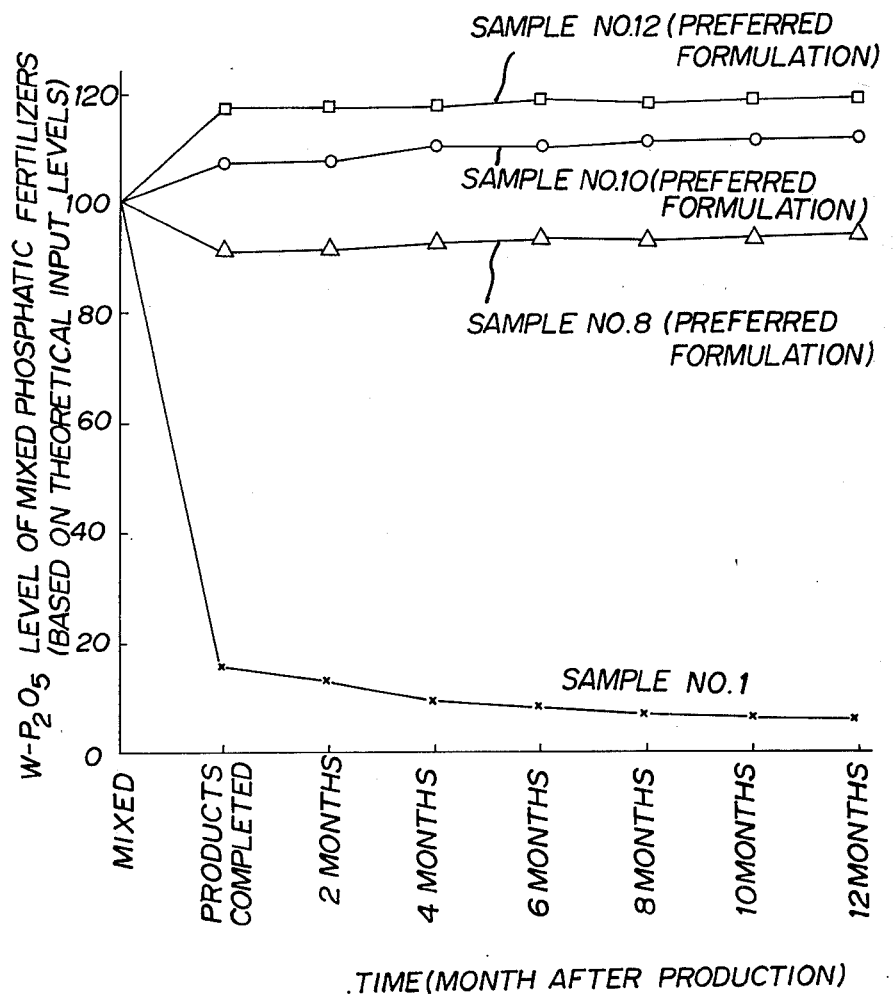

MIXED PHOSPHATIC FERTILIZER AND PROCESS FOR PRODUCING THE SAME

This is a continuation of application Ser. No. 185,741 filed Sept. 10, 1980, now abandoned.

The present invention relates to a mixed phosphatic fertilizer having both water-soluble and citric acid-soluble phosphoric acid contents as well as to a process for producing such a mixed phosphatic fertilizer and, more specifically, it relates to such a mixed phosphatic fertilizer having a stabilized predetermined level of such water-soluble phosphoric acid contents and a process for producing the same.

Fused phosphate, a typical phosphatic fertilizer, is generally produced by melting a mixture of about 100 parts by weight of phosphate rock and about 90 parts by weight of serpentine at about 1400° C., water-cooling the resultant molten mixture to obtain a vitreous matter and then grinding the vitreous matter to fine mesh. Since fused phosphate is useful for fertilization of volcanic ash soil or the like soils having a high phosphoric acid absorption coefficient due to its citric solubility, its demand and consumption has been increasing in recent years. However, since the citric solubility of phosphoric acid contents of fused phosphate tends to deter the development or revelation of its fertilizing effect, it has been proposed to mix fused phosphate with calcium superphosphate, calcium triple-superphosphate or the like fertilizers having water-soluble phosphoric acid for compensating such a tendency.

Nevertheless, since fused phosphate contains such alkaline ingredients as 28–30% by weight of CaO and 17–20% by weight of MgO, the water-soluble phosphoric acid contents will react with these alkaline ingredients to produce water-insoluble contents (hereinafter this reaction shall be referred to as reduction or insolubilization) so long as any phosphatic fertilizers having such water-soluble phosphoric acid contents are merely added to the fused phosphate. Therefore, in order to secure a predetermined level of water-soluble phosphoric acid contents in a mixed phosphatic fertilizer, an excessively large quantity of calcium superphosphate, calcium triple-superphosphate or the like fertilizers having water-soluble phosphoric acid contents must be added to fused phosphate. Further, the extent of such insolubilization of water-soluble phosphoric acid contents is greatly affected by grain size distribution or major grain sizes of fused phosphate. That is to say, as the grain size of fused phosphate increases, the water-soluble phosphoric acid contents of the resultant mixed phosphatic fertilizer tend to undergo a higher degree of insolubilization or reduction. Besides, the resultant mixed phosphatic fertilizer undergoes a gradual insolubilization of its water-soluble phosphoric acid contents during its storage. Under these circumstances, it is difficult to secure a stabilized predetermined level of water-soluble phosphoric acid contents in the resultant mixed phosphatic fertilizer.

Accordingly, an object of the present invention is to provide a mixed phosphatic fertilizer having an improved fertilizing effect in which a stabilized predetermined level of water-soluble phosphoric acid contents is secured along with a predetermined level of citric acid-soluble phosphoric acid contents, because such phosphoric acid contents are prevented from being reduced or insolublized.

Another object of the present invention is to provide such an improved mixed phosphatic fertilizer comprising a mixture of fused phosphate as a main component and at least one component selected from a specific group consisting of calcium superphosphate, calcium triple-superphosphate and phosphoric acid, and at least 15% by weight of humic acid.

Still another object of the present invention is to provide such an improved mixed phosphatic fertilizer comprising a mixture of 80–98 parts by weight of fused phosphate and 20–2 parts by weight of a component selected from the specific group consisting of calcium superphosphate, calcium triple-superphosphate and phosphoric acid, and at least 15% or, more preferably, 20–50% by weight of humic acid.

Yet another object of the present invention is to provide a process for producing such an improved mixed phosphatic fertilizer.

The humic acid herein referred to is obtained by a well-known process. That is to say, it is produced by grinding young coal such as lignite, brown coal or peat moss, and then oxidizing and decomposing the thus ground young coal in the presence of nitric acid.

As is well-known, such humic acid as mentioned above shows a high cation exchange capacity in soil.

According to the present invention, such humic acid is added to a mixture of well-known fused phosphate and the aforementioned phosphatic fertilizers having water-soluble phosphoric acid contents in an amount of at least 15% or, more preferably 20–50% by weight on a resultant mixture quantity basis in a mixer under hard agitation for securing a sufficient reaction. Since this reaction is accomplished solid to solid, it is preferable to add, as a reaction medium, 20–30% by weight of water based on the first-cited mixture. Although it is not necessary to specially heat the reaction system, heating is effective to accelerate the reaction.

As a result of the foregoing reaction, alkalis such as calcium and magnesium contained in the fused phosphate react with radicals of the humic acid to produce chelate compounds. Of course, such alkalis can be effectively utilized as citric acid-soluble lime and magnesia when the resultant mixture is applied to the soil.

Then, at least one fertilizer selected from the group consisting of calcium superphosphate, calcium triple-superphosphate and phosphoric acid is added. Since such alkaline ingredients of the fused phosphate as CaO are masked as a result of the reaction with humic acid initially added thereto as described previously, the water-soluble phosphoric acid contents of the aforementioned phosphatic fertilizers such as calcium superphosphate cannot react with these alkaline ingredients of the fused phosphate any more. Thus, unlike the prior art mixed phosphatic fertilizers, the water-soluble phosphoric acid contents are neither insolubilized nor fixed at all. Therefore, according to the present invention, a mixed phosphatic fertilizer having a predetermined level of water-soluble phosphoric acid contents as against a predetermined level of citric acid-soluble phosphoric acid contents can readily be obtained by mixing with a predetermined quantity of fused phosphate at least one phosphatic fertilizer such as calcium superphosphate in a precalculated quantity equivalent to the aforesaid predetermined level of water-soluble phosphoric acid contents.

It is to be noted here that according to the present invention the phosphatic fertilizers having water-soluble phosphoric acid contents such as calcium superphosphate may be added to fused phosphate simultaneously with humic acid so long as the latter is added thereto, although such a simultaneous addition may more or less kill the effect of the humic acid to prevent insolubilization of water-soluble phosphoric acid contents during the course of mixing the feed materials. In this case also, the cation exchange capacity of humic acid is effective to selectively react the same with the alkaline ingredients of the fused phosphate to produce chelate compounds and, thus, to prevent the simultaneously added water-soluble phosphoric acid contents from being reacted with these alkaline ingredients to be insolubilized.

As described herein-above, the present invention provides an improved process comprising an addition of humic acid for producing an improved mixed phosphatic fertilizer which comprises a mixture of fused phosphate thus treated with humic acid and at least one component selected from the specific group consisting of calcium superphosphate, calcium triple-superphosphate and phosphoric acid. Nevertheless, the mixed phosphatic fertilizer according to the present invention has water-soluble phosphoric acid contents in a very stabilized form which are substantially free from the effect of the grain size of fused phosphate and which are not decreased by reduction even after a long period of storage.

Further, the humic acid used according to the present invention not only functions as a soil conditioner as is well-known, but also is effective to diffuse and infiltrate alkaline ingredients into soil. Thus, the mixed phosphatic fertilizer according to the present invention can exhibit a fertilizing effect remarkably improved over that of the prior art mixed phosphatic fertilizers due to synergistic effects of its stabilized predetermined citric acid-soluble and water-soluble phosphoric acid contents in combination with humic acid having the aforementioned effects.

These and other objects and features of the present invention will be obvious from the following detailed description of the invention which will be best understood when read in connection with the accompanying drawing, in which:

BRIEF DESCRIPTION OF THE DRAWING

FIG. 1 is a chart showing curves of water-soluble phosphoric acid contents of several mixed phosphatic fertilizers plotted against lapse of time.

EXPERIMENT 1

(1) Feed materials

TABLE 1

| | Phosphoric acid contents (wt. %) | | | Acid-insoluble alkali-soluble contents |
|---|---|---|---|---|
| | $P_2O_5$ | | | |
| Feed Materials | $S-P_2O_5$ | $C-P_2O_5$ | $W-P_2O_5$ | |
| Fused phos- | — | 213 | tr. | — |

TABLE 1-continued

| | Phosphoric acid contents (wt. %) | | | Acid-insoluble alkali-soluble contents |
|---|---|---|---|---|
| | $P_2O_5$ | | | |
| Feed Materials | $S-P_2O_5$ | $C-P_2O_5$ | $W-P_2O_5$ | |
| phate (commercially available) | | | | |
| Calcium triple-superphosphate (commercially available) | 44.4 | — | 40.2 | — |
| Humic acid (produced by Japan Metals & Chemical Co., Ltd.) | — | — | — | *80 |

Notes:
[1]$S-P_2O_5$ denotes soluble phosphoric acid content; $C-P_2O_5$ citric acid-soluble phosphoric acid content; and $W-P_2O_5$ water-soluble phosphoric acid content. The same shall apply hereinafter.
*[2]Content (as dry) insoluble in 3.5% but hydrochloric acid soluble in 1% aqueous solution of sodium hydroxide.

The foregoing feed materials were put into a blending mixer by the respective sample formulations No. 1 through 20 given in Table 2. The thus fed raw materials were mixed therein for a sufficient reaction in the presence of about 20–30% by weight of water based on the respective feedstock weights. The resultant samples were analyzed for their citric acid-soluble and water-soluble phosphoric acid contents, the results of which are given in Table 3 as contrasted to their theoretical levels before mixing and reaction. In Tables 2 and 3, samples No. 7 through 20 each represent a mixing formulation according to the present invention.

TABLE 2

| | Mixing formulation humic acid | | |
|---|---|---|---|
| | Mixing formulation humic acid | | |
| Sample No. | Fused phosphate | Calcium triple-superphosphate | Humic acid |
| 1 | 95 | 5 | — |
| 2 | 90 | 10 | — |
| 3 | 80 | 20 | — |
| 4 | 70 | 30 | — |
| 5 | 60 | 40 | — |
| 6 | 95 | 5 | 11.12 (10) |
| 7 | 95 | 5 | 17.65 (15) |
| 8 | 95 | 5 | 25.00 (20) |
| 9 | 95 | 5 | 33.33 (25) |
| 10 | 95 | 5 | 42.85 (30) |
| 11 | 95 | 5 | 53.85 (35) |
| 12 | 95 | 5 | 66.67 (40) |
| 13 | 95 | 5 | 100.00 (50) |
| 14 | 95 | 5 | 150.00 (60) |
| 15 | 90 | 10 | 17.65 (15) |
| 16 | 90 | 10 | 25.00 (20) |
| 17 | 90 | 10 | 42.85 (30) |
| 18 | 90 | 10 | 66.67 (40) |
| 19 | 80 | 20 | 25.00 (20) |
| 20 | 80 | 20 | 66.67 (40) |

Parenthesized numerals each show a percentage based on the total weight of each mixed fertilizer sample.

TABLE 3

| | Theoretical level (wt. %) | | | Analyzed level (wt. %) | | | |
|---|---|---|---|---|---|---|---|
| Sample No. | $C-P_2O_5$ | $W-P_2O_5{}^a$ | $\dfrac{W-P_2O_5}{C-P_2O_5} \times 100$ | $C-P_2O_5$ | $W-P_2O_5{}^b$ | $\dfrac{W-P_2O_5}{C-P_2O_5} \times 100$ | Effective $W-P_2O_5$ content (a/b × 100) |
| 1 | 22.45 | 2.01 | 8.95 | 22.43 | 0.30 | 1.34 | 14.93 |
| 2 | 23.61 | 4.02 | 17.03 | 23.56 | 0.61 | 2.59 | 15.17 |
| 3 | 25.92 | 8.04 | 31.02 | 25.89 | 1.23 | 4.06 | 15.31 |
| 4 | 28.23 | 12.06 | 42.72 | 28.19 | 1.87 | 6.63 | 15.51 |
| 5 | 30.54 | 16.08 | 52.65 | 30.64 | 2.51 | 8.19 | 15.61 |
| 6 | 20.21 | 1.81 | 8.96 | 20.16 | 0.84 | 4.17 | 46.41 |

TABLE 3-continued

| | Theoretical level (wt. %) | | | Analyzed level (wt. %) | | | |
|---|---|---|---|---|---|---|---|
| Sample No. | $C-P_2O_5$ | $W-P_2O_5{}^a$ | $\frac{W-P_2O_5}{C-P_2O_5} \times 100$ | $C-P_2O_5$ | $W-P_2O_5{}^b$ | $\frac{W-P_2O_5}{C-P_2O_5} \times 100$ | Effective $W-P_2O_5$ content (a/b × 100) |
| 7 | 19.03 | 1.70 | 5.93 | 18.98 | 1.34 | 7.06 | 78.91 |
| 8 | 17.96 | 1.61 | 8.96 | 17.89 | 1.44 | 8.05 | 89.56 |
| 9 | 17.10 | 1.53 | 8.95 | 17.11 | 1.47 | 8.59 | 96.31 |
| 10 | 16.33 | 1.46 | 8.94 | 16.34 | 1.54 | 9.42 | 105.31 |
| 11 | 15.62 | 1.40 | 8.96 | 15.66 | 1.63 | 10.41 | 116.31 |
| 12 | 14.97 | 1.34 | 8.95 | 14.95 | 1.64 | 10.97 | 122.31 |
| 13 | 13.82 | 1.24 | 8.97 | 13.80 | 1.63 | 11.81 | 131.46 |
| 14 | 8.98 | 0.80 | 8.91 | 8.79 | 1.06 | 12.06 | 132.50 |
| 15 | 20.01 | 3.41 | 17.04 | 20.10 | 2.50 | 12.43 | 73.26 |
| 16 | 18.89 | 3.22 | 17.05 | 18.99 | 2.84 | 14.96 | 88.31 |
| 17 | 17.17 | 2.92 | 17.01 | 17.21 | 2.89 | 16.79 | 98.91 |
| 18 | 15.74 | 2.68 | 17.03 | 15.76 | 2.77 | 17.58 | 103.26 |
| 19 | 20.74 | 6.43 | 31.00 | 20.69 | 4.52 | 21.85 | 70.29 |
| 20 | 17.28 | 5.36 | 31.02 | 17.31 | 5.29 | 30.56 | 98.65 |

Analyzed citric acid-soluble and water-soluble phosphoric acid contents

As understood from Table 3, those samples having no humic acid content (Samples No. 1 through 5) obviously undergo insolubilization of their water-soluble phosphoric acid contents to such an extent that the resultant mixed phosphatic fertilizers contain only about 15% by weight of input water-soluble phosphoric acid contents. Thus, such formulations having no humic acid content show an extremely low yield of water-soluble phosphoric acid contents.

However, the formulations according to the present invention (represented by Samples No. 7 through 20) undergo remarkably small insolubilization of such water-soluble phosphoric acid contents, also as shown in Table 3. Further, as the humic acid content of the feed mixture formulation increases, the effective water-soluble phosphoric acid contents of the resultant mixed phosphatic fertilizer increase proportionately. However, with a humic acid content by 10% by weight, the resultant mixed phosphatic fertilizer has an effective water-soluble phosphoric acid content lower than a half, namely, only 46%. Thus, it is preferred that the feed mixture formulation contains at least 15% by weight of humic acid. In the meantime, with a humic acid content of the feed mixture formulation, its additional increase does not significantly contribute to the effective water-soluble phosphoric acid content any more, but acts to decrease the citric acid-soluble phosphoric acid contents. Thus, a mixture containing such an excessive quantity of humic acid will more or less lose its practicability as a fertilizer. In this sense, it is preferred that the feed mixture contains from about 15% to about 50% by weight of humic acid.

EXPERIMENT 2

Samples No. 1, 8, 10 and 12 of Experiment 1 were analyzed to determine changes in water-soluble phosphoric acid contents during the course of their preparation and with lapse of time thereafter, the results of which are shown in FIG. 1. As understood from FIG. 1, the mixed phosphatic fertilizer having no humic acid content (Sample No. 1) undergoes during the course of its preparation a remarkable reduction or insolubilization of its water-soluble phosphoric acid contents as a result of mixing or reaction of fused phosphate and calcium triple-superphosphate. Thus, its water-soluble phosphoric acid contents are not only lost remarkably during the course of its preparation, but also gradually decreased with lapse of time after the preparation. While, the mixed phosphatic fertilizers according to the present invention show an extremely small insolubilization of or, conversely, even a small increase in their water-soluble phosphoric acid contents during the course of their preparation. Besides, they retain almost the same levels of water-soluble phosphoric acid contents as those observed upon their preparation even after one year of storage without significant changes with time. This means that the mixed phosphatic fertilizers according to the present invention have a very stable quality with their water-soluble phosphoric acid contents securable over a long period after production.

EXPERIMENT 3

In this experiment, instead of calcium triple-superphosphate of Experiment 1, there was used a phosphoric acid source which was a commercially available 45% (as $H_3PO_4$) aqueous solution of phosphoric acid. Then, Samples No. 1 through 15 were prepared in the same manner as in Experiment 1 by using formulations shown in Table 4. The resultant mixed phosphatic fertilizer samples were subjected to analysis, the results of which are summarized in Table 5. In this experiment, Samples No. 5 through 15 represent the formulations according to the present invention.

TABLE 4

| | Mixing formulation | | |
|---|---|---|---|
| | Mixing formulation (wt. %) | | |
| Sample No. | Fused phosphate | Aqueous phosphoric acid solution (as $P_2O_5$) | Humic acid |
| 1 | 98 | 2 | — |
| 2 | 95 | 5 | — |
| 3 | 90 | 10 | — |
| 4 | 85 | 15 | — |
| 5 | 98 | 2 | 17.65 (15) |
| 6 | 98 | 2 | 25.00 (20) |
| 7 | 98 | 2 | 42.85 (30) |
| 8 | 98 | 2 | 66.67 (40) |
| 9 | 98 | 2 | 100.00 (50) |
| 10 | 95 | 5 | 25.00 (20) |
| 11 | 95 | 5 | 42.85 (30) |
| 12 | 95 | 5 | 66.67 (40) |
| 13 | 95 | 5 | 100.00 (50) |
| 14 | 90 | 10 | 25.00 (20) |
| 15 | 90 | 10 | 66.67 (40) |

TABLE 5

Analyzed citric acid-soluble and water-soluble phosphoric acid content

| Sample No. | Theoretical level (wt. %) | | | Analyzed level (wt. %) | | | Effective W—$P_2O_5$ content (a/b × 100) |
|---|---|---|---|---|---|---|---|
| | C—$P_2O_5$ | W—$P_2O_5^a$ | $\frac{W—P_2O_5}{C—P_2O_5} \times 100$ | C—$P_2O_5$ | W—$P_2O_5^b$ | $\frac{W—P_2O_5}{C—P_2O_5} \times 100$ | |
| 1 | 22.71 | 1.99 | 8.8 | 22.74 | 0.16 | 0.70 | 8.26 |
| 2 | 24.82 | 4.91 | 19.8 | 24.70 | 0.52 | 2.10 | 10.56 |
| 3 | 28.10 | 9.64 | 34.3 | 26.94 | 1.10 | 4.08 | 11.37 |
| 4 | 31.31 | 14.20 | 45.4 | 31.13 | 1.88 | 6.04 | 13.21 |
| 5 | 19.25 | 1.69 | 8.78 | 19.31 | 1.41 | 7.30 | 83.67 |
| 6 | 18.17 | 1.59 | 8.75 | 18.20 | 1.61 | 8.85 | 101.30 |
| 7 | 16.52 | 1.45 | 8.78 | 16.49 | 1.72 | 10.43 | 118.51 |
| 8 | 15.14 | 1.33 | 8.78 | 15.11 | 1.76 | 11.65 | 132.16 |
| 9 | 13.98 | 1.22 | 8.73 | 13.89 | 1.62 | 11.66 | 132.79 |
| 10 | 19.86 | 3.93 | 19.79 | 19.79 | 3.16 | 15.97 | 80.29 |
| 11 | 18.05 | 3.57 | 19.78 | 18.10 | 3.40 | 18.78 | 95.26 |
| 12 | 16.55 | 3.27 | 19.56 | 16.54 | 3.35 | 20.25 | 102.36 |
| 13 | 15.27 | 3.02 | 19.78 | 15.30 | 3.74 | 24.44 | 123.86 |
| 14 | 22.48 | 7.71 | 34.30 | 22.41 | 6.04 | 26.95 | 78.31 |
| 15 | 18.73 | 6.43 | 34.33 | 18.70 | 5.49 | 29.36 | 85.37 |

As understood from Table 5, an aqueous solution of phosphoric acid reacts well on fused phosphate to such an extent that the effective water-soluble phosphoric acid contents of the resultant mixed phosphateic fertilizer are reduced to 8-13% of their input levels, as shown by Samples No. 1 through 4.

While, in the mixed phosphatic fertilizers according to the present invention represented by Samples No. 5 through 15, the effective water-soluble phosphoric acid contents are as high as 84% or above showing an effect of humic acid to prevent insolubilization or reduction of such water-soluble phosphoric acid contents in mixing a phosphoric acid source and fused phosphate.

EXPERIMENT 4

In this experiment, in order to determine the effect of grain sizes of fused phosphate as a feed material, the same fused phosphate as those used in Experiments No. 1 and 2 has its grain sizes adjusted to up to mesh No. 16 on the one hand and above mesh No. 16 but up to mesh No. 100 on the other, and the same experiment procedure as that of Experiment 1 was repeated, the results of which are summarized in Table 6.

As understood from Table 6, those formulations without humic acid content undergo an increased reduction or insolubilization of water-soluble phosphoric acid contents as the grain size of the feed fused phosphate increases. Thus, without humic acid content, the resultant mixed phosphatic fertilizers have a remarkably decreased effective water-soluble phosphoric acid content.

While, the mixed phosphatic fertilizer products having the formulations according to the present invention are hardly affected by the grain sizes of the feed fused phosphate, as shown in Table 6.

Thus, the process according to the present invention favorably features that in producing mixed phosphatic fertilizers fused phosphate can be mixed with calcium superphosphate or the like phosphatic fertilizers having water-soluble phosphoric acid contents without specially taking into consideration the grain sizes of the fused phosphate.

EXPERIMENT 5

In this experiment, Komatsuna, a kind of Chinese cabbage, was fertilized with Samples No. 3, 7, 8, 10, 12 and 13 of Experiment 1 to determine their fertilizing effect, the results of which are summarized in Table 7.

TABLE 6

Effect of different grain sizes of fused phosphate

| Sample No. | Mixing formulation (wt. %) | | | | Water-soluble phosphoric acid content (W—$P_2O_5$) | | |
|---|---|---|---|---|---|---|---|
| | Fused phosphate | calcium triple-superphosphate | Aqueous phosphoric acid solution (as $P_2O_5$) | Humic acid | Theoretical level | Analyzed level | Effective W—$P_2O_5$ content |
| 1 | A95 | 5 | — | — | 2.01 | 0.30 | 14.93 |
| 2 | B95 | 5 | — | — | 2.01 | 0.14 | 6.97 |
| 3 | A95 | 5 | — | 25.00(20) | 1.61 | 1.44 | 89.56 |
| 4 | B95 | 5 | — | 25.00(20) | 1.61 | 1.37 | 85.09 |
| 5 | A95 | 5 | — | 66.67(40) | 1.21 | 1.48 | 122.31 |
| 6 | B95 | 5 | — | 66.67(40) | 1.21 | 1.45 | 120.15 |
| 7 | A90 | 10 | — | — | 4.02 | 0.61 | 15.17 |
| 8 | B90 | 10 | — | — | 4.02 | 0.21 | 5.22 |
| 9 | A90 | 10 | — | 25.00(20) | 3.22 | 2.84 | 88.31 |
| 10 | B90 | 10 | — | 25.00(20) | 3.22 | 2.71 | 84.16 |
| 11 | A90 | 10 | — | 66.67(40) | 2.41 | 2.49 | 103.26 |
| 12 | B90 | 10 | — | 66.67(40) | 2.41 | 2.53 | 104.85 |
| 13 | A98 | — | 2 | — | 1.99 | 0.16 | 8.26 |
| 14 | B98 | — | 2 | — | 1.99 | 0.08 | 4.02 |
| 15 | A98 | — | 2 | 25.00(20) | 1.59 | 1.61 | 101.30 |
| 16 | B98 | — | 2 | 25.00(20) | 1.59 | 1.57 | 98.74 |
| 17 | A98 | — | 2 | 66.67(40) | 1.19 | 1.57 | 132.16 |
| 18 | B98 | — | 2 | 66.67(40) | 1.19 | 1.51 | 130.52 |
| 19 | A95 | — | 5 | — | 4.91 | 0.52 | 10.51 |
| 20 | B95 | — | 5 | — | 4.91 | 0.27 | 5.50 |

TABLE 6-continued

Effect of different grain sizes of fused phosphate

| | Mixing formulation (wt. %) | | | Water-soluble phosphoric acid content (W—$P_2O_5$) | | | |
|---|---|---|---|---|---|---|---|
| Sample No. | Fused phosphate | calcium triple-superphosphate | Aqueous phosphoric acid solution (as $P_2O_5$) | Humic acid | Theoretical level | Analyzed level | Effective W—$P_2O_5$ content |
| 21 | A95 | — | 5 | 25.00(20) | 3.93 | 3.16 | 80.29 |
| 22 | B95 | — | 5 | 25.00(20) | 3.93 | 3.08 | 78.37 |
| 23 | A95 | — | 5 | 66.67(40) | 2.95 | 3.02 | 102.36 |
| 24 | B95 | — | 5 | 66.67(40) | 2.95 | 3.01 | 112.14 |

In the fused phosphate column, grain sizes up to mesh No. 16 are indicated as A, and those up above No. 16 but up to 100 as B.

TABLE 7

Fertilizing effect analysis

| Sample No. | Fertilized with | Crop level (g./pot as dry) | | | | Ration (%) | Analyzed phosphoric acid contents | | | percentage utilization |
|---|---|---|---|---|---|---|---|---|---|---|
| | | Shoot | Index | Root | Index | | Content (mg/pot) | Absorption (mg/pot) | Index | |
| | No added | 8.46 | 57 | 1.20 | 79 | 0.80 | 70.03 | — | — | — |
| | Fused phosphate | 14.72 | 100 | 1.52 | 100 | 1.48 | 216.19 | 146.16 | 100 | 29.2 |
| 3 | Control mixed phosphatic fertilizer a | 14.04 | 95 | 1.53 | 101 | 1.84 | 258.25 | 188.22 | 129 | 37.6 |
| | Control mixed phosphatic fertilizer b | 15.01 | 102 | 1.60 | 105 | 1.75 | 263.42 | 194.39 | 133 | 38.9 |
| 7 | Preferred fertilizer A of the present invention | 15.52 | 105 | 1.65 | 109 | 2.01 | 312.80 | 242.77 | 166 | 48.6 |
| 8 | Preferred fertilizer B of the present invention | 15.69 | 107 | 1.75 | 115 | 1.88 | 294.56 | 224.53 | 154 | 44.9 |
| 10 | Preferred fertilizer C of the present invention | 18.08 | 123 | 1.84 | 121 | 1.85 | 335.25 | 265.22 | 182 | 53.0 |
| 12 | Preferred fetilizer D of the present invention | 19.03 | 129 | 2.08 | 137 | 1.89 | 358.17 | 288.14 | 197 | 57.6 |
| 13 | Preferred fertilizer E of the present invention | 18.95 | 129 | 2.10 | 138 | 2.08 | 389.36 | 313.30 | 214 | 62.7 |

Notes:
1. Experiment scale: a/5000 Wagner's pot, triple replication
2. Test soil: Humus volcanic ash soil
3. Test plant: Komatsuna, a kind of Chinese cabbage
4. Fertilizing weight of phosphoric acid contents: 0.5 g of $P_2O_5$ per pot in terms of C—$P_2O_5$
5. Control mixed phosphatic fertilizer composition: 3.94% C—$P_2O_5$, 11.95% W—$P_2O_5$, and W—$P_2O_5$/C—$P_2O_5$ × 100 = 34.2
6. The percentage utilization is determined by absorption/500 × 100.

As understood from Table 8, the mixed phosphatic fertilizers according to the present invention all show significantly higher crop levels as compared with those shown by fused phosphate only or control mixed phosphatic fertilizers without addition of humic acid. Also, it is shown that the crop level increases with the quantity of humic acid added to the feedstock of the phosphatic fertilizer. Further, the mixed phosphatic fertilizers according to the present invention exhibit a higher fertilizing effect with a relatively low water-soluble phosphoric acid content.

In addition, it is obvious that the mixed phosphatic fertilizers according to the present invention all show a remarkably higher percentage utilization as compared with the control mixed phosphatic fertilizers. Supposedly, such improved features may be attributable to synergistic effects of citric acid-soluble and water-soluble phosphoric acid contents themselves and as combined with humic acid which itself has various soil conditioning effects.

What is claimed is:

1. A mixed phosphatic fertilizer obtained by adding and mixing from about 17.65 to about 100 parts by weight of humic acid with 100 parts by weight of a mixture of about 80 to 98% by weight of fused phosphate as a main component and about 20 to 2% by weight of at least one compound selected from a specific group consisting of calcium superphosphate, calcium triple-superphosphate and phosphoric acid.

* * * * *